(12) United States Patent
Watanabe et al.

(10) Patent No.: US 8,199,971 B2
(45) Date of Patent: Jun. 12, 2012

(54) OBJECT DETECTION SYSTEM WITH IMPROVED OBJECT DETECTION ACCURACY

(75) Inventors: Akihiro Watanabe, Aichi-ken (JP); Noriaki Shirai, Kariya (JP); Satoshi Osanai, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 704 days.

(21) Appl. No.: 12/356,834

(22) Filed: Jan. 21, 2009

(65) Prior Publication Data

US 2009/0185717 A1 Jul. 23, 2009

(30) Foreign Application Priority Data

Jan. 21, 2008 (JP) ................................. 2008-010841

(51) Int. Cl.
*G06K 9/00* (2006.01)
*G06K 9/46* (2006.01)
*G06K 9/56* (2006.01)

(52) U.S. Cl. ........ 382/103; 382/205; 382/203; 382/209; 382/219; 382/220; 382/228

(58) Field of Classification Search ................. 382/181, 382/209, 190, 103, 205, 203, 219–220, 228; 348/414, 417, 418, 422.1
See application file for complete search history.

(56) References Cited

U.S. PATENT DOCUMENTS

| | | | | |
|---|---|---|---|---|
| 5,799,098 | A * | 8/1998 | Ort et al. | 382/125 |
| 5,991,430 | A * | 11/1999 | Hsu et al. | 382/124 |
| 6,141,440 | A * | 10/2000 | Melen | 382/154 |
| 6,408,089 | B1 * | 6/2002 | Ito et al. | 382/141 |
| 7,082,225 | B2 * | 7/2006 | Endo et al. | 382/291 |
| 7,359,901 | B2 * | 4/2008 | Lee et al. | 1/1 |
| 7,925,076 | B2 * | 4/2011 | Abe et al. | 382/151 |
| 2001/0036300 | A1 * | 11/2001 | Xia et al. | 382/125 |
| 2005/0074160 | A1 * | 4/2005 | Miyashita | 382/151 |

(Continued)

FOREIGN PATENT DOCUMENTS

| | | |
|---|---|---|
| JP | 9-81726 | 3/1997 |
| JP | H11-266450 | 9/1999 |
| JP | 2002-352239 | 12/2002 |

OTHER PUBLICATIONS

Japanese Office Action dated Nov. 1, 2011, issued in corresponding Japanese Application No. 2008010841 with English Translation.

*Primary Examiner* — Jingge Wu
*Assistant Examiner* — Avinash J Yentrapati
(74) *Attorney, Agent, or Firm* — Nixon & Vanderhye PC

(57) ABSTRACT

In a system for detecting a target object, a similarity determining unit sets a block in a picked-up image, and compares a part of the picked-up image contained in the block with a pattern image data while changes a location of the block in the picked-up image to determine a similarity of each part of the picked-up image contained in a corresponding one of the different-located blocks with respect to the pattern image data. A specifying unit extracts some different-located blocks from all of the different-located blocks. The determined similarity of the part of the picked-up image contained in each of some different-located blocks is equal to or greater than a predetermined threshold similarity. The specifying unit specifies, in the picked-up image, a target area based on a frequency distribution of some different-located blocks therein.

4 Claims, 10 Drawing Sheets

U.S. PATENT DOCUMENTS

| | | | |
|---|---|---|---|
| 2005/0213793 A1* | 9/2005 | Oya et al. | 382/103 |
| 2005/0281454 A1* | 12/2005 | Miyashita | 382/145 |
| 2007/0071304 A1* | 3/2007 | Kuchii et al. | 382/141 |
| 2007/0133863 A1* | 6/2007 | Sakai et al. | 382/151 |
| 2008/0240575 A1* | 10/2008 | Panda et al. | 382/209 |
| 2008/0273800 A1* | 11/2008 | Hatabu | 382/209 |
| 2008/0310700 A1* | 12/2008 | Fukusawa et al. | 382/141 |
| 2009/0060348 A1* | 3/2009 | Monro | 382/209 |
| 2009/0185717 A1* | 7/2009 | Watanabe et al. | 382/103 |

* cited by examiner

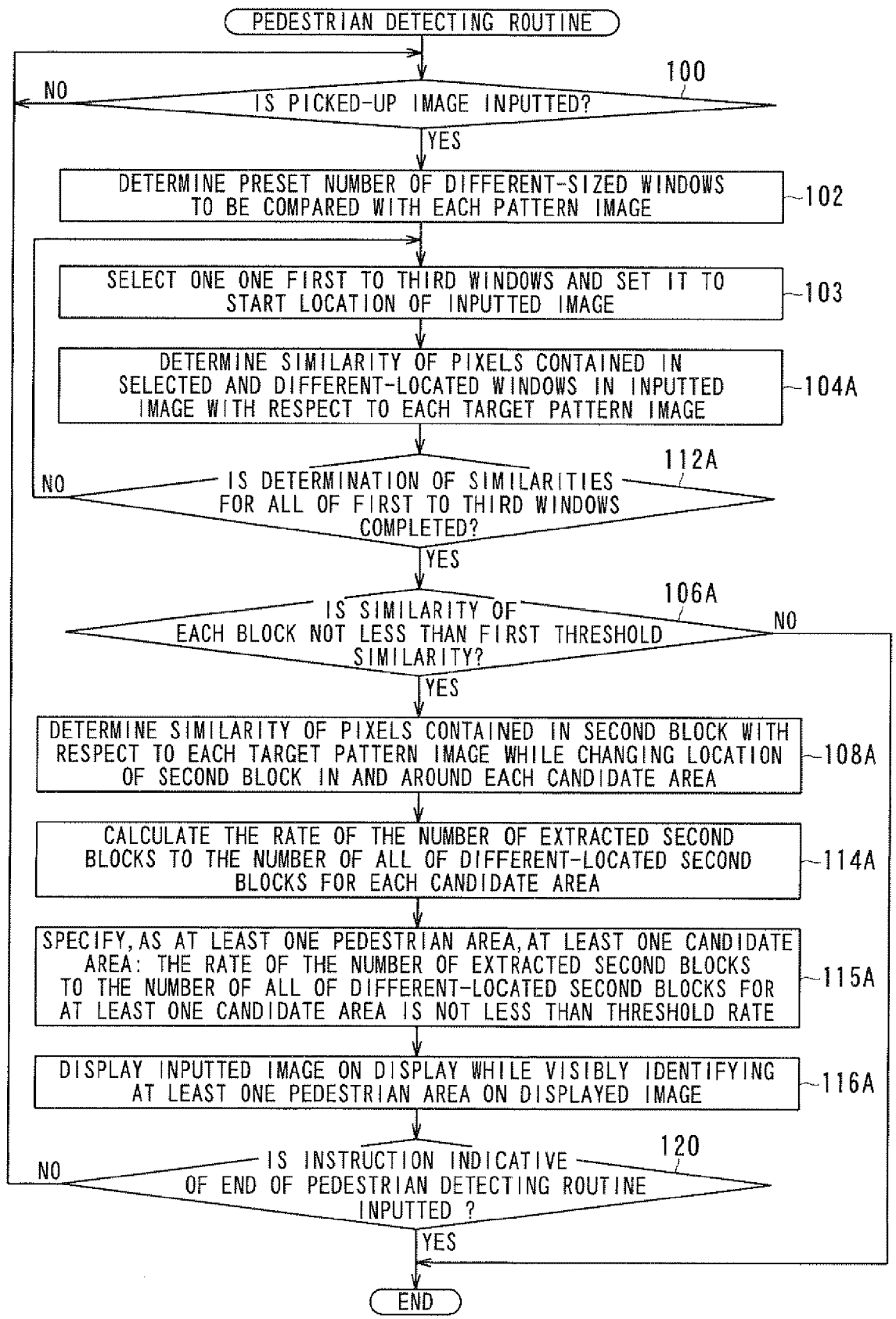

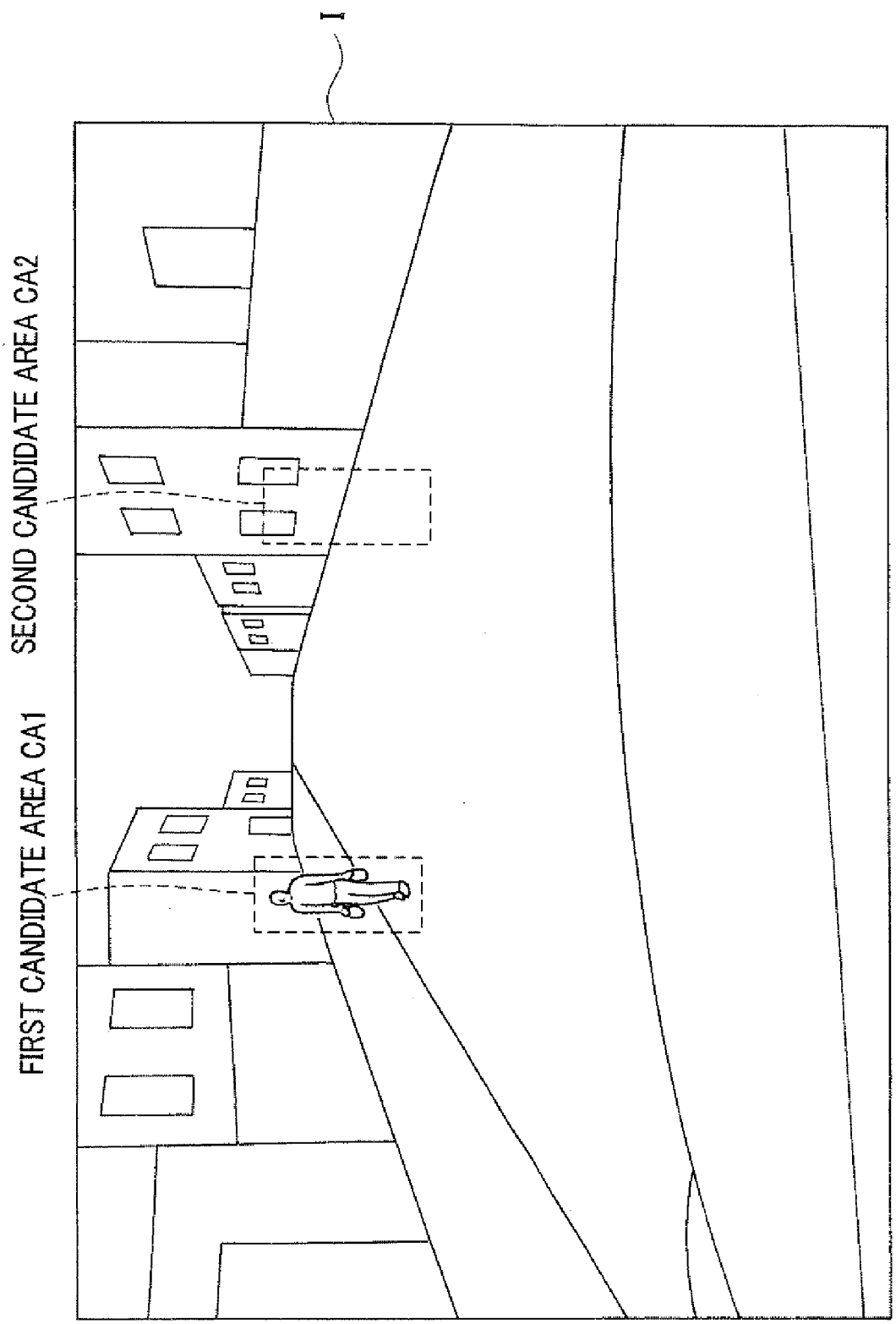

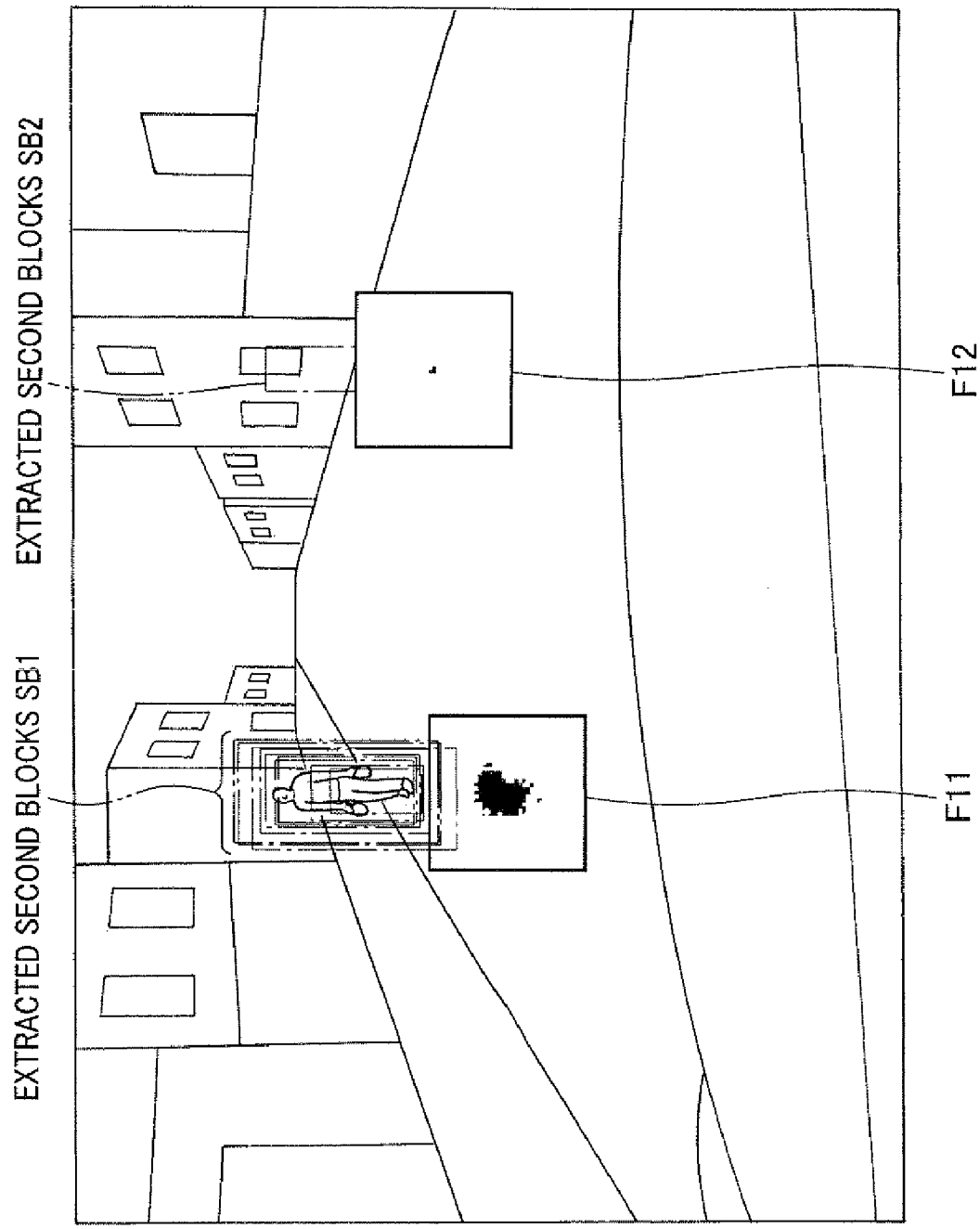

OBJECT DETECTION SYSTEM WITH IMPROVED OBJECT DETECTION ACCURACY

CROSS REFERENCE TO RELATED APPLICATIONS

This application is based on Japanese Patent Application 2008-010841 filed on Jan. 21, 2008. This application claims the benefit of priority from the Japanese Patent Application, so that the descriptions of which are all incorporated herein by reference.

FIELD OF THE INVENTION

The present invention relates to object detection systems for detecting a target object from a plurality of images picked up by a pickup device, such as a camera.

BACKGROUND OF THE INVENTION

Some types of conventional object detection methods are designed to detect a target object from a plurality of images picked up by a pickup device, such as a camera, using pattern-matching techniques.

For example, Japanese Patent Application Publication No. H09-081726 discloses such an object detection method. The method disclosed in the Patent Publication matches the pattern of an input image in which a target object can exist with a predetermined target pattern corresponding to the target object. This matching extracts, as a matching candidate pixel, a pixel in the input image with a matching rate that exceeds a preset matching rate.

The method also obtains the distribution profile of the matching rates of pixels in the input image around the matching candidate pixel, and determines whether the distribution profile is in agreement with the profile of an ideal distribution; this ideal distribution approximates a normal distribution.

Upon determining that the distribution profile is in agreement with the profile of the ideal normal distribution, the method determines that the candidate pixel is a matching point (matching area) in the input image with respect to the predetermined target pattern.

Otherwise, upon determining that the distribution profile is wider than the profile of the ideal normal distribution, the method determines that the candidate pixel is not a matching point in the input image with respect to the predetermined target pattern.

However, the method disclosed in the Patent Publication may deteriorate the detection accuracy for target objects.

Specifically, when a target object is present in an area (referred to as "target area") of an input image, the target area has a higher degree of similarity with respect to the target pattern, and a first different area around the target area has a higher degree of similarity with respect to the target pattern. The first different area around the target area has a size larger or smaller than that of the target area and/or has a location different from that of the target area.

In contrast, even if a part of a second different area of the input image in which no target object is present has a higher degree of similarity with respect to the target pattern, most of the remaining part of the second different area has a lower degree of similarity with respect to the target pattern.

For this reason, the distribution profile of the matching rate in the second different area in which no target object is present is not wider than that of the matching rate in the target area in which the target object is present. Thus, the method disclosed in the Patent Publication may not detect that the second different area in which no target object is present is not a matching area in the input image with respect to the predetermined target pattern. This may result in deteriorating the detection accuracy for target objects.

In addition, if the distribution profile of the target area in which the target object is present is different from the profile of an ideal normal distribution, the method disclosed in the Patent Publication may not detect that the target area in which the target object is present is a matching area in the input image with respect to the predetermined target pattern. This also may result in deteriorating the detection accuracy for target objects.

SUMMARY

In view of the circumstances set forth above, an object of an aspect of the present invention is to provide object detection systems capable of detecting target objects with a higher object detection accuracy as compared with the object detection accuracy of the conventional method set forth above.

According to one aspect of the present invention, there is provided a system for detecting a target object. The system includes an image pick-up unit configured to pick up an image of a predetermined target region, and a storage unit configured to store therein pattern image data for the target object. The pattern image data represents a feature of the target object. The system includes a similarity determining unit configured to:

set a block in the picked-up image; and compare a part of the picked-up image contained in the block with the pattern image data while changing a location of the block in the picked-up image to thereby determine a similarity of each of the parts of the picked-up image contained in a corresponding one of the different-located blocks with respect to the pattern image data. The system includes a specifying unit configured to:

extract some of the different-located blocks from all of the different-located blocks, the determined similarity of the part of the picked-up image contained in each of some of the different-located blocks is equal to or greater than a predetermined threshold similarity; and specify, in the picked-up image, a target area in which the target object is present based on a frequency distribution of some of the different-located blocks therein.

According to another aspect of the present invention, there is provided a system for detecting a target object. The system includes an image pick-up unit configured to pick up an image of a predetermined target region, and a storage unit configured to store therein pattern image data for the target object. The pattern image data represents a feature of the target object. The system includes a similarity determining unit configured to:

set a first block in the picked-up image;

compare a first part of the picked-up image contained in the first block with the pattern image data while coarsely shifting a location of the first block in the picked-up image to thereby determine a similarity of each of the first parts of the picked-up image contained in a corresponding one of the different-located first blocks with respect to the pattern image data;

extract, as at least one candidate area, at least one of the different-located first blocks, the determined similarity of the first part of the picked-up image contained in the least one of the different-located first blocks is equal to or greater than a predetermined first threshold similarity;

set a second block in the picked-up image; and compare a second part of the picked-up image contained in the second block with the pattern image data while changing a location of the second block in and around the at least one candidate area in the picked-up image to thereby determine a similarity of each of the second parts of the picked-up image contained in a corresponding one of the different-located second blocks with respect to the pattern image data. The system includes a specifying unit configured to:

extract some of the different-located second blocks from all of the different-located second blocks, the determined similarity of the second part of the picked-up image contained in each of some of the different-located second blocks is equal to or greater than a predetermined second threshold similarity; and specify, in the picked-up image, a target area in which the target object is present based on a frequency distribution of some of the different-located second blocks therein.

BRIEF DESCRIPTION OF THE DRAWINGS

Other objects and aspects of the invention will become apparent from the following description of embodiments with reference to the accompanying drawings in which:

FIG. 7 is a flowchart schematically illustrating a pedestrian detecting routine to be executed by the CPU according to the second embodiment;

FIG. 9A is a view schematically illustrating, as dashed rectangular frames, first and second specified candidate areas on the picked-up image, the first specified candidate area corresponding to a zone in which an actual pedestrian is present, the second specified candidate area corresponding to a zone in which no pedestrians are present; and FIG. 9B is a view schematically illustrating, on the picked-up image, extracted second blocks in and around the first specified candidate area, and extracted second blocks in and around the second specified candidate area according to the second embodiment.

DETAILED DESCRIPTION OF EMBODIMENTS OF THE INVENTION

Figure 1:
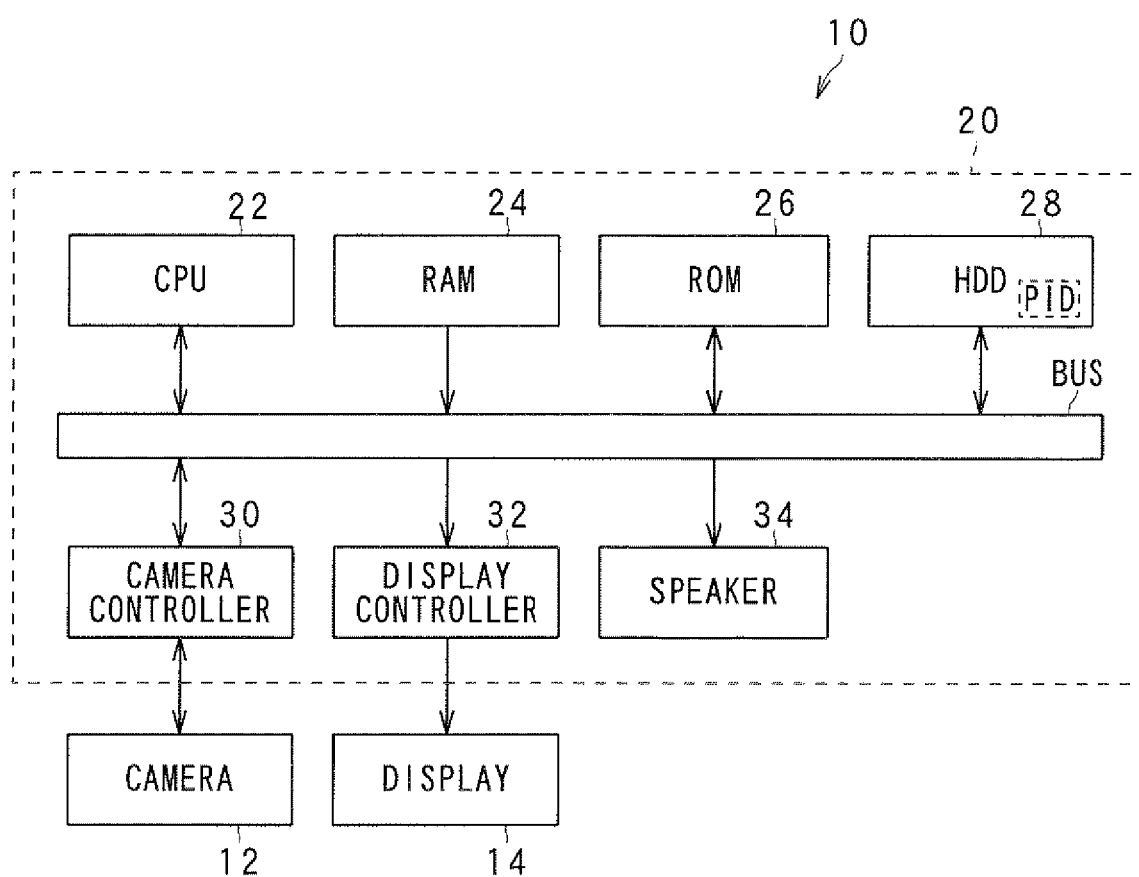
FIG. 1 is a block diagram schematically illustrating an example of the overall hardware structure of a driver assist system according to a first embodiment of the present invention.

Embodiments of the present invention will be described hereinafter with reference to the accompanying drawings. In the drawings, identical reference characters are utilized to identify identical corresponding components.

In each of the embodiments, the present invention is applied to a driver assist system installed in a vehicle for detecting pedestrians around the vehicle so as to warn a driver of the vehicle.

First Embodiment

Referring to FIG. 1, there is illustrated an example of the overall structure of a driver assist system 10 according to a first embodiment of the present invention.

The driver assist system 10 includes a camera 12, a display 14, and a main unit 20.

The camera 12 is mounted on one side of a body (outer shell) mounted on a frame of the vehicle and operative to periodically or continuously pick up a plurality of two-dimensional images (frame images) of a predetermined target region around the vehicle; this target region is defined based on the location of the camera 12 to be mounted on the vehicle body.

For example, each of the plurality of picked-up images consists of a matrix of m and n pixels each representing the light intensity (brightness) of a corresponding location thereof.

In the first embodiment, the camera 12 is mounted on a front side of the vehicle body. For example, the camera 12 is mounted on a bumper mounted on a front grille of a front panel (front body area) of an engine compartment of the vehicle body, or mounted on the front grille thereof. The location of the camera 12 defines the predetermined target region ahead of the front of the vehicle. In other words, the predetermined target region is changed in location with change in the location of the vehicle.

The display 14 is electrically connected to the main unit 20 and operative to display, on its screen, various items of information sent from the main unit 20 in color.

The main unit 20 is electrically connected to the camera 12. The main unit 20 works to receive the plurality of images of the predetermined target region picked-up by the camera 12, and to determine whether at least one pedestrian is present in the predetermined target region based on the received plurality of picked-up images.

The main unit 20 also works to measure the location of at least one pedestrian upon determining that the at least one pedestrian is present in the predetermined target region, and to give information associated with the at least one pedestrian to the driver according to the measured location of the determined at least one pedestrian.

Referring to FIG. 1, the main unit 20 includes a CPU 22, a RAM (Random Access Memory) 24, a ROM (Read Only Memory), such as a rewritable ROM, 25, a HDD (Hard Disk Drive) 28, a camera controller 30, a display controller 32, a speaker 34, and a system bus BUS. The components 22, 24, 26, 28, 30, 32, and 34 allow communications thereamong via the system bus BUS.

The CPU 22 is operative to control the overall operations of the driver assist system 10.

The RAM 24 serves as a work area being used by the CPU 22 that is running at least one of a plurality of types of programs including a pedestrian detection program.

The rewritable ROM 26 stores therein beforehand the plurality of types of programs and various parameters required for the CPU 22 to run the plurality of types of programs.

The HDD 28 works to store therein various items of information usable by the CPU 22.

The camera controller 30 works to control the picking-up operations of the camera 12 in cooperation with the CPU 22.

The display controller 32 works to control, in cooperation with the CPU 22, how to display, on the screen of the display 14, various items of information including images and/or messages sent from the CPU 22.

The speaker 34 works to audibly output, into the vehicle, various items of information including warnings to the driver.

The CPU 22 works to:

access the RAM 24, the rewritable ROM 26, and the HDD 28;

control the picking-up operations of the camera 12 via the camera controller 30;

control how to display, on the screen of the display 14, various items of information including images and/or messages via the display controller 32; and control how to audibly output, from the speaker 34, various items of information into the vehicle.

In the HDD 28, pattern image data PID is stored beforehand. The pattern image data PID includes a plurality of target pattern images in digital format respectively indicative of a plurality of features of pedestrians as targets to be detected by the driver assist system 10.

For example, each of the plurality of pattern images consists of arrayed pixels each representing the light intensity (brightness) of a corresponding location thereof. Each of the pattern images has a corresponding specific pattern of its pixels; this specific pattern corresponds to one of the plurality of features of pedestrians.

Figure 2:
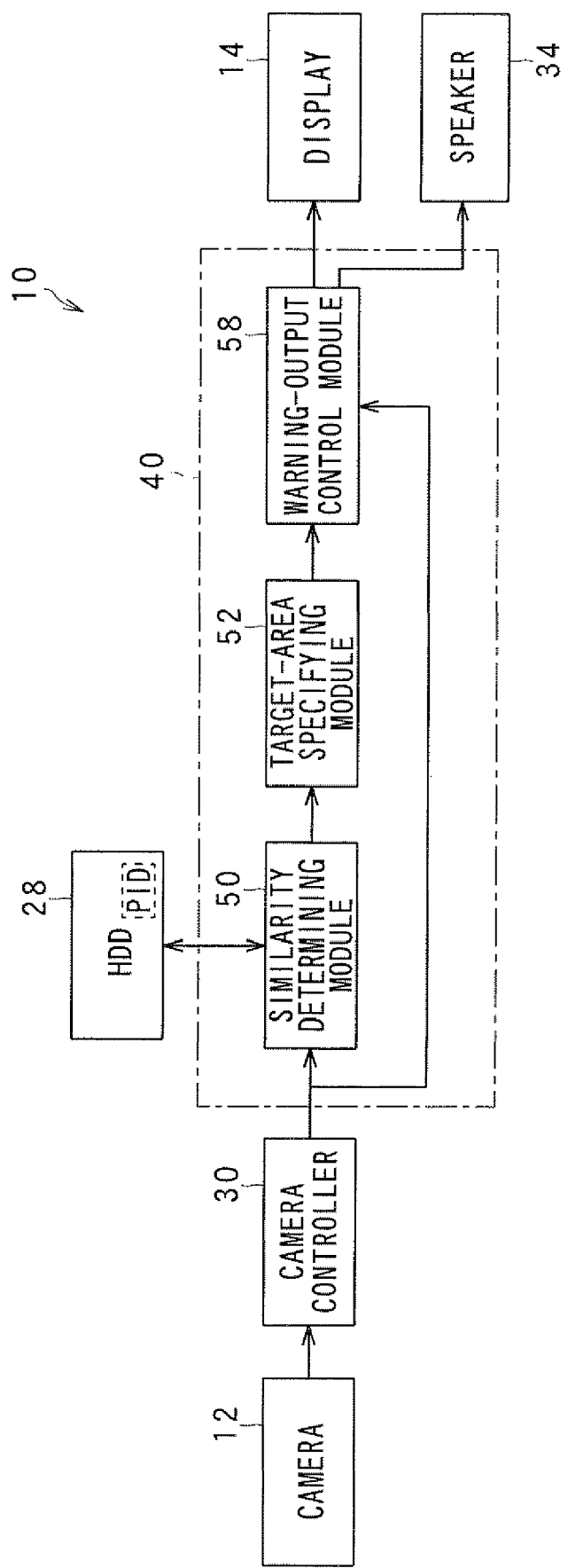
FIG. 2 is a block diagram schematically illustrating an example of a functional module to be implemented by the driver assist system illustrated in FIG. 1.

Referring to FIG. 2, the driver assist system 10 includes a functional module 40 implemented by the main unit 20.

The functional module 40 includes a similarity determining module 50, a target-area specifying module 52, and a warning-output control module 58. The similarity determining module 50 is operatively connected to the target-area specifying module 52, and the target-area specifying module 52 is operatively connected to the warning-output control module 58.

The camera controller 30 is operatively connected to the similarity determining module 50 and the warning-output control module 58. The camera controller 30 works to sequentially input, to both the similarity determining module 50 and the warning-output control module 58, the plurality of images in digital format picked-up by the camera 12.

Every time one of the plurality of picked-up images is inputted to the similarity determining module 50, the similarity determining module 50 works to repeatedly compare pixels contained in a block in the inputted image with each of the plurality of pattern images of the pattern image data PID stored in the HDD 28 while changing the location and size of the block over the entire of the inputted image without skipping pixel lines of the inputted image.

Furthermore, the similarity determining module 50 works to determine the similarity of the pixels included in each of the different sized and located blocks with respect to each of the plurality of target pattern images based on the result of the repeated comparisons. The similarity of the pixels included in each of the different sized and located blocks with respect to each of the plurality of target pattern images will be referred to as "the similarity of each of the different sized and located blocks with respect to each of the plurality of target pattern images" hereinafter.

The similarity determining module 50 further works to output, to the target-area specifying module 52, the determined similarities of each of the different sized and located blocks with respect to the respective target pattern images.

The target-area specifying module 52 works to receive the determined similarities of each of the different sized and located blocks with respect to the respective target pattern images. The target-area specifying module 52 also works to extract, as candidate areas, some blocks from all of the different sized and located blocks; the similarity of each of these candidate areas (some blocks) is equal to or greater than a predetermined threshold similarity.

The target-area specifying module 52 further works to:

calculate the total number of the candidate areas;

specify, as at least one pedestrian area, at least one region containing the number of some candidate areas that are closely arranged in the distribution; the rate of this number of some candidate areas to the total number of the candidate areas is equal to or greater than a predetermined threshold rate; and determine that a pedestrian is present in the at least one pedestrian area.

In addition, the target-area specifying module 52 works to output, to the warning-output control module 58, information indicative of the location of the specified at least one pedestrian area.

The warning-output control module 58 is operatively connected to the display 14 and the speaker 34.

The warning-output control module 58 works to receive the plurality of picked-up images sequentially inputted thereto from the camera controller 30. The warning-output control module 58 also works to receive the information indicative of the location of the specified at least one pedestrian area; this information is inputted to the module 58 from the target-area specifying module 52.

The warning-output control module 58 works to sequentially display, on the screen of the display 14, the plurality of received picked-up images. When the information indicative of the location of the specified at least one pedestrian area is inputted to the warning-output control module 58, the warning-output control module 58 works to change how to display the specified at least one pedestrian area in a corresponding at least one of the received picked-up images on the screen of the display 14.

For example, when the information indicative of the location of the specified at least one pedestrian area is inputted to the warning-output control module 58, the warning-output control module 58 works to change the color of the whole or periphery of the specified at least one pedestrian area to a red color to thereby give a warning for pedestrians to the driver.

When the information indicative of the location of the specified at least one pedestrian area is inputted to the warning-output control module 58, the warning-output control module 58 can be operative to cause the speaker 34 to output, into the vehicle, an audible warning and/or an audible warning message for pedestrians.

The functional module 40 can be implemented by the main unit 20 in software, hardware, or combinations of software and hardware.

Figure 3:
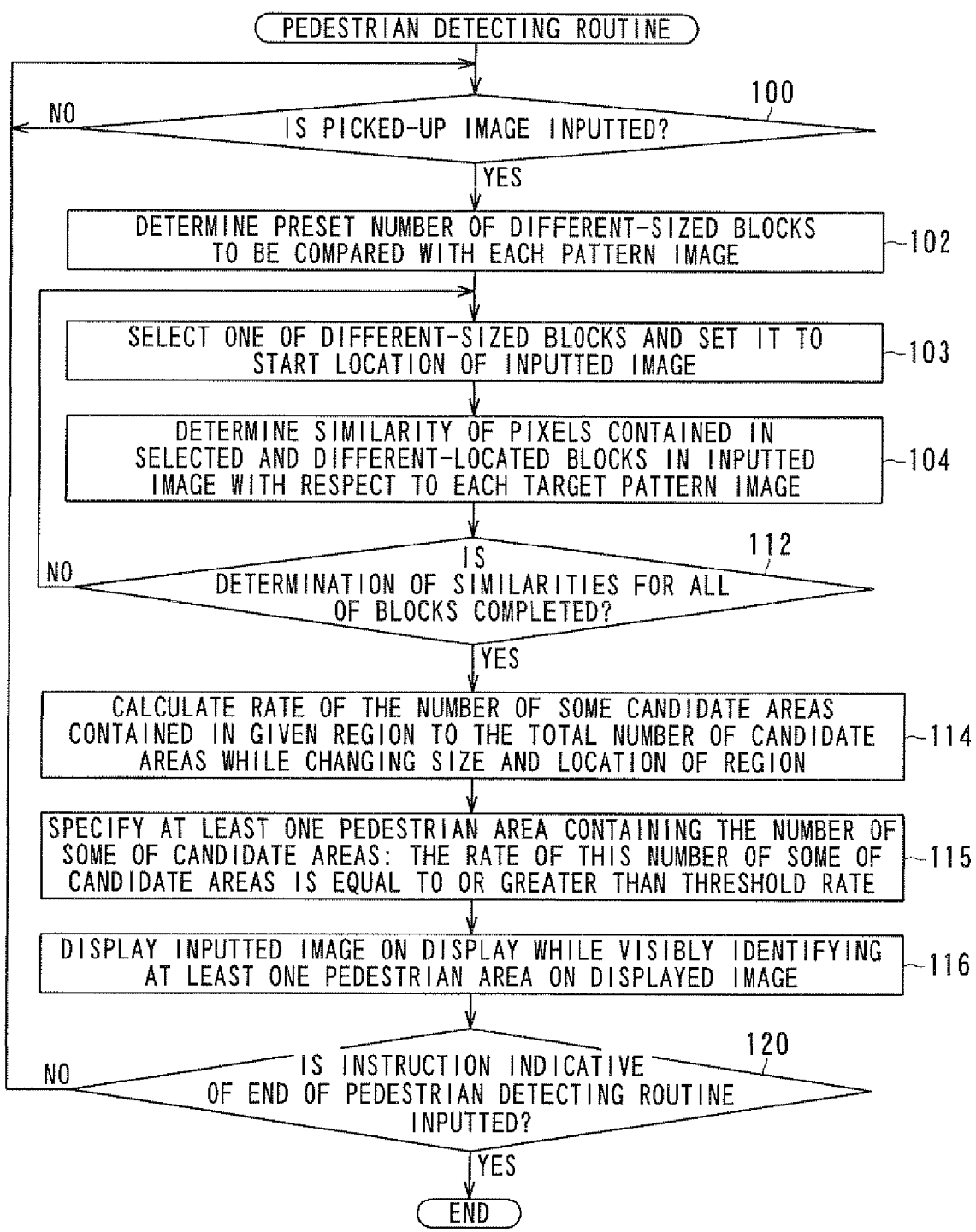
FIG. 3 is a flowchart schematically illustrating a pedestrian detecting routine to be executed by a CPU illustrated in FIG. 2 according to the first embodiment.

For example, when the functional module 40 can be implemented by the main unit 20 in software, at least one pedestrian detecting program stored in the rewritable ROM 26 or the RAM 24 causes the CPU 22 to carry out a pedestrian detecting routine illustrated in FIG. 3. The at least one pedestrian detecting program can be installed beforehand in the rewritable ROM 26 or the RAM 24, or can be installed into the rewritable ROM 26 or the RAM 24 by the CPU 22 from a computer-readable signal bearing media (recoding media). The at least one pedestrian detecting program can be installed into the rewritable ROM 26 or the RAM 24 by the CPU 22 when it is externally delivered to the CPU 22 through a wired network and/or a radio network.

Next, operations of the driver assist system 10 will be described hereinafter with reference to FIGS. 3, 4, and 5.

FIG. 3 is a flowchart illustrating the pedestrian detecting routine to be executed by the CPU 22 in accordance with the pedestrian detecting program according to the first embodiment. For example, the pedestrian detecting program is programmed to be executed by the CPU 22 each time a vehicle control unit, such as an ECU (Electronic Control Unit), installed in the vehicle sends, to the driver assist system 10, an instruction indicative of the start of the pedestrian detecting routine at a preset timing when, for example, an engine switch of the vehicle is turned on.

When starting the pedestrian detecting routine in accordance with the pedestrian detecting program, the CPU 22 waits for an input of an image picked-up by the camera 12 from the camera controller 30 in step 100.

Specifically, the CPU 22 repeats the operation in step 100 until an image picked-up by the camera 12 is inputted to the CPU 22 via the camera controller 30.

When an image picked-up by the camera 12 is inputted to the CPU 22 via the camera controller 30 (the determination in step 100 is YES), the CPU 22 stores the inputted picked-up image in the RAM 24, and provides a preset number of different-sized blocks to be compared with each of the plurality of pattern images in stop 102.

For example, in the first embodiment, the CPU 22 provides different sized blocks W1, W2, and W3. Each of the different-sized blocks W1, W2, and W3 for example consists of a matrix of pixels smaller than the number of pixels of the inputted picked-up image. The matrix size of the block W1 is smaller than that of the block W2, and the matrix size of the block W2 is smaller than that of the block W3.

In step 103, the CPU 22 selects one of the different-sized blocks W1 to W3, and sets the selected one of the different-sized blocks W1 to W3 to, as a start location, the top left corner of the inputted picked-up image.

For example, in the first embodiment, the CPU 22 selects the block W1, and sets the selected block W1 to, as the start location, the top left corner of the inputted picked-up image.

Figure 4:
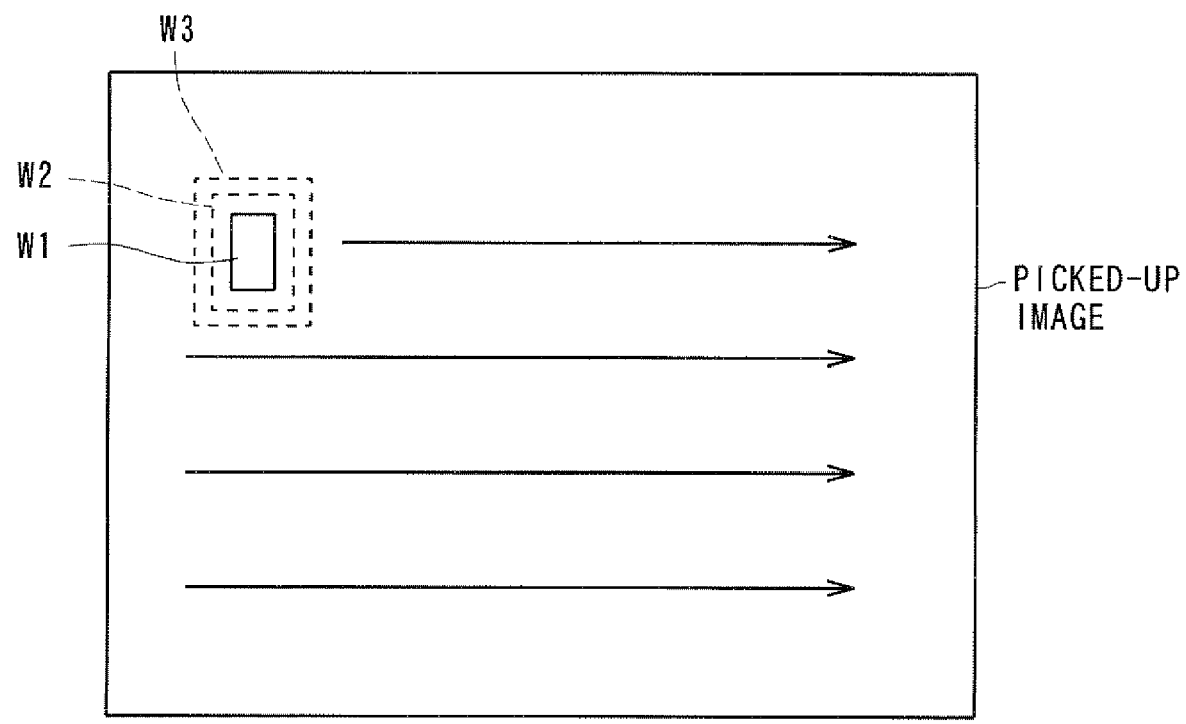
FIG. 4 is a view schematically illustrating how to sample pixels to be compared with a plurality of pattern images; these pixels are contained in an image picked-up by a camera illustrated in FIGS. 1 and 2 according to the first embodiment.

Thereafter, the CPU 22 compares pixels contained in the block W1 in the inputted picked-up image with each of the plurality of pattern images of the pattern image data PID while shifting the block W1 from the start location to, as an end location, the bottom right corner of the inputted picked-up image in the row direction over the entire of the inputted picked-up image in step 104 (see FIG. 4).

In step 104, the CPU 22 determines the similarity of the pixels contained in each of the different-located blocks W1 in the inputted picked-up image with respect to each of the plurality of target pattern images based on the result of the comparisons.

Thereafter, in step 112, the CPU 22 determines whether the determination of the similarities for all of the blocks W1 to W3 is completed.

At that time, because the determination of the similarities for all of the different-located blocks W1 is merely completed, the CPU 22 determines that the determination of the similarities for all of the blocks W1 to W3 is not completed.

Then, the CPU 22 returns to step 103 to thereby select, as another one of the different-sized blocks W1 to W3, the block W2, and sets the selected the selected block W2 to the top left corner of the inputted picked-up image.

Thereafter, the CPU 22 carries out the operation in step 104 based on the selected block W2 in place of the block W1 to thereby determine the similarity of the pixels contained in each of the different-located blocks W2 in the inputted picked-up image with respect to each of the plurality of target pattern images based on the result of the comparisons.

Next, in step 112, the CPU 22 determines whether the determination of the similarities for all of the blocks W1 to W3 is completed.

At that time, because the determination of the similarities for all of the different-located blocks W1 and that of the similarities for all of the different-located blocks W2 are merely completed, the CPU 22 determines that the determination of the similarities for all of the blocks W1 to W3 is not completed.

Then, the CPU 22 returns to step 103, and carries out the operations in steps 103 and 104 based on the block W3 in place of the block W2. This determines the similarity of the pixels contained in each of the different-located blocks W3 in the inputted picked-up image with respect to each of the plurality of target pattern images based on the result of the comparisons.

At that time, because the determination of the similarities for all of the blocks W1 to W3 is completed, the CPU 22 carries out affirmative determination in step 112, going to step 114.

In step 114, the CPU 22 extracts, as candidate areas, some blocks from all of the different-located blocks W1 to W3; the similarity of each of these candidate areas (some blocks) is equal to or greater than the predetermined threshold similarity.

In step 114, the CPU 22 calculates the total number of the candidate areas, and calculates the rate of the number of some candidate areas contained in a given region to the total number of the candidate areas while changing the size and location of the region.

Thereafter, in step 115, the CPU 22 specifies, as at least one pedestrian area, a region containing the number of some candidate areas that are closely arranged in the distribution; the rate of this number of some candidate areas contained in the region to the total number of the candidate areas is equal to or greater than the predetermined threshold rate. In step 115, the CPU 22 determines that a pedestrian is present in the at least one pedestrian area.

Figure 5:
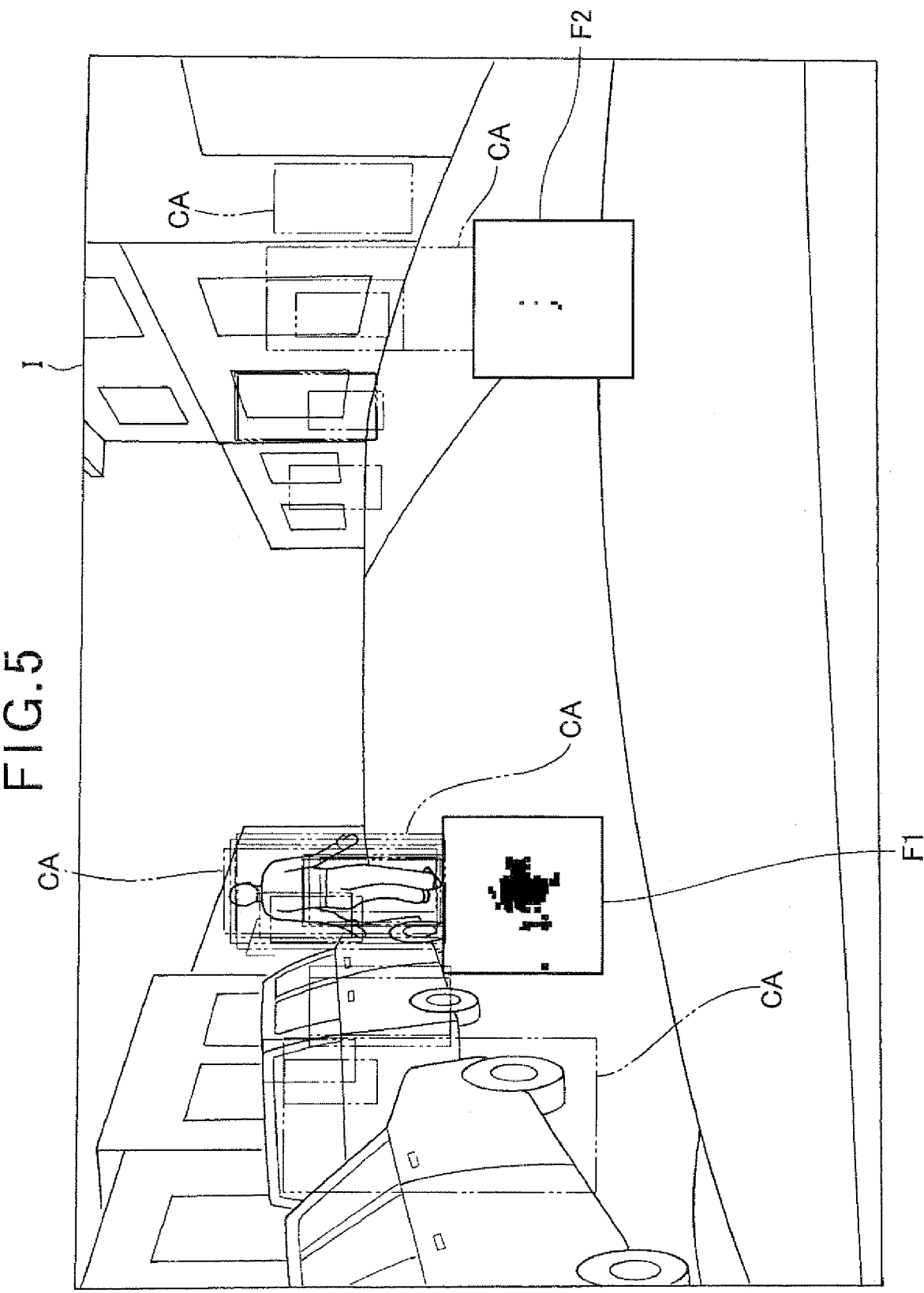
FIG. 5 is a view schematically illustrating candidate areas extracted by the CPU in the picked-up image according to the first embodiment.

FIG. 5 schematically illustrates, as two-dot chain-lined rectangular frames, the candidate areas to which reference character "CA" is assigned on the inputted picked-up image to which reference character "I" is assigned.

FIG. 5 also schematically illustrates, on the inputted picked-up image I, a first frequency distribution F1 of some of the candidate areas that are located in or around a zone in which an actual pedestrian is present, and a second frequency distribution F2 of some of the candidate areas that are located to be away from the zone. Specifically, in FIG. 5, the substantially center pixel of each of the corresponding candidate areas is dotted in black to thereby provide each of the first and second frequency distributions F1 and F2.

Referring to FIG. 5, in or around the zone, a large number of the candidate areas are closely arranged, but in or around another zone, a few candidate areas are closely arranged.

Therefore, when the rate of the number of some candidate areas contained in at least one of the different-sized and located regions to the total number of the candidate areas is equal to or greater than the predetermined threshold rate, it is possible to specify, as at least one pedestrian area, the at least one of the different-sized and located regions containing the number of some candidate areas (see steps 114 and 115).

This prevents the CPU 22 from erroneously specifying, as at least one pedestrian area, a region in or around which a few candidate areas are closely located; the rate of a few candidate areas to the total number of the candidate areas is smaller than the threshold rate. This can specify the at least one pedestrian area with high accuracy.

Note that the predetermined threshold similarity and the threshold rate can be determined by tests using the actual driver assist system 10 and/or by computer simulations.

After completion of the operation in step 115, the CPU 22 displays the inputted picked-up image on the screen of the display 14 in color while visibly identifying the specified at least one pedestrian area on the displayed picked-up image in step 116.

For example, the CPU 22 changes the color of the whole or periphery of the specified at least one pedestrian area to a red color to thereby give a warning for pedestrians to the driver.

Next, the CPU 22 determines whether an instruction indicative of the end of the pedestrian detecting routine has been inputted from the ECU in step 120. The instruction can be inputted from the ECU to the driver assist system 10 when, for example, the engine switch of the vehicle is turned off.

Upon determining that no instructions indicative of the end of the pedestrian detecting routine are inputted from the ECU to the driver assist system 10 (NO in step 120), the CPU 22 returns to step 100 and repeatedly carries out the operations in steps 100 to 120 illustrated in FIG. 3 until an affirmative determination is made in step 120.

Otherwise, upon determining that the instruction indicative of the end of the pedestrian detecting routine is inputted from the ECU to the driver assist system 10 (YES in step 120), the CPU 22 exits the pedestrian detecting routine.

As described above, the driver assist system 10 according to the first embodiment is designed to repeatedly compare pixels contained in a block in the inputted image with each of the plurality of pattern images of the pattern image data PID stored in the HDD 2S while changing the location and size of the block over the entire of the inputted image.

The driver assist system 10 is also designed to determine the similarity of each of the different sized and located blocks with respect to each of the plurality of target pattern images based on the result of the repeated comparisons, and extract, as candidate areas, some blocks from all of the different sized and located blocks; the similarity of each of these candidate areas (some blocks) is equal to or greater than a predetermined threshold similarity.

Furthermore, the driver assist system 10 is designed to specify, as at least one pedestrian area, at least one region containing the number of some candidate areas that are closely arranged in the distribution; the rate of this number of some candidate areas to the total number of the candidate areas is equal to or greater than the predetermined threshold rate.

The configuration of the driver assist system 10 avoids a region in or around which some closely-located candidate areas from being incorrectly specified as at least one pedestrian area; the rate of the number of some closely-arranged candidate areas to the total number of the candidate areas is smaller than the threshold rate. This makes it possible to specify the at least one pedestrian area with high accuracy.

Second Embodiment

An example of the functional structure of a driver assist system 10A according to a second embodiment of the present invention will be described hereinafter. The hardware structure of the driver assist system 10A is substantially identical to that of the driver assist system 10 according to the first embodiment illustrated in FIG. 1. Like parts between the driver assist systems 10 and 10A according to the first and second embodiments, to which like reference characters are assigned, are omitted or simplified in description.

Figure 6:
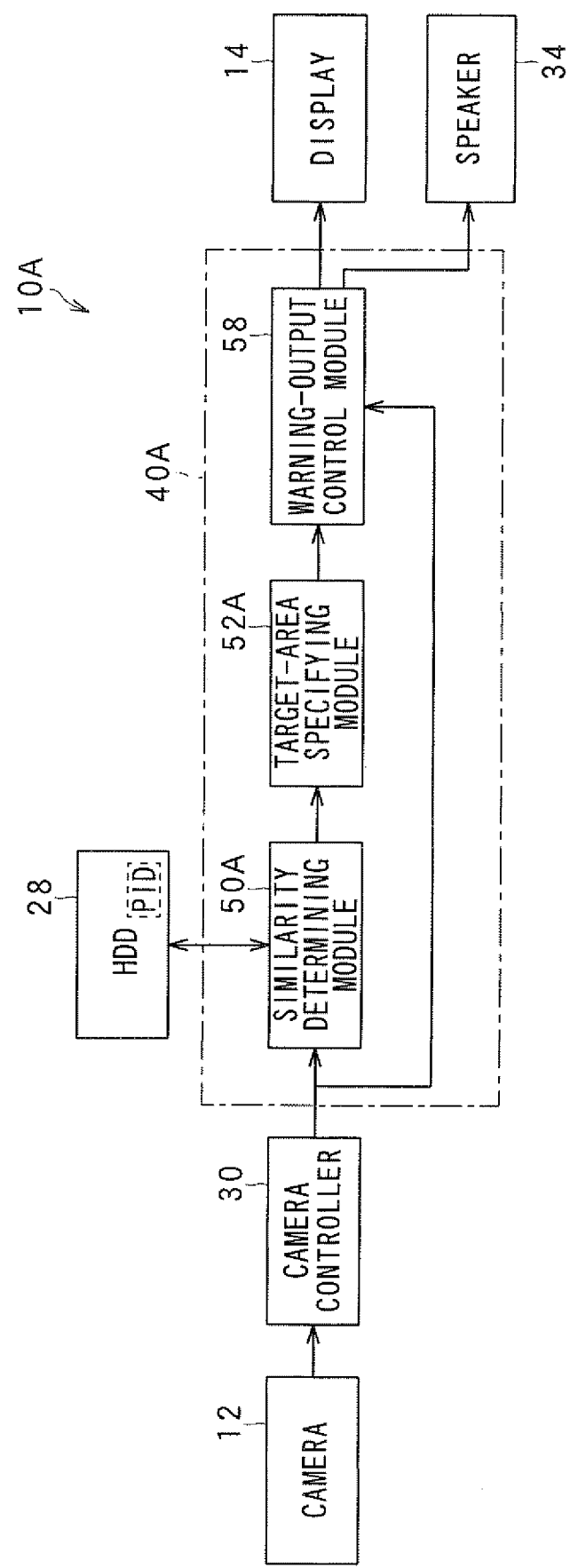
FIG. 6 is a block diagram schematically illustrating an example of a functional module to be implemented by a driver assist system according to a second embodiment of the present invention.

Referring to FIG. 6, the driver assist system 10A includes a functional module 40A implemented by the main unit 20.

The functional module 40A includes a similarity determining module 50A, a target-area specifying module 52A, and the warning-output control module 58. The similarity determining module 50A is operatively connected to the target-area specifying module 52A, and the target-area specifying module 52A is operatively connected to the warning-output control module 58.

Every time one of the plurality of picked-up images is inputted to the similarity determining module 50A, the similarity determining module 50 works to repeatedly compare pixels contained in a first block in the inputted image with each of the plurality of pattern images of the pattern image data PID stored in the HDD 28 while changing the location and size of the first block over the entire of the inputted image with at least one pixel line of the inputted image being skipped.

The similarity determining module 50A works to determine the similarity of the pixels included in each of the different sized and located first blocks with respect to each of the plurality of target pattern images based on the result of the repeated comparisons. The similarity of the pixels included in each of the different sized and located first blocks with respect to each of the plurality of target pattern images will be referred to as "the similarity of each of the different sized and located first blocks with respect to each of the plurality of target pattern images" hereinafter.

The similarity determining module 50A works to extract, as candidate areas, some first blocks from all of the different sized and located first blocks; the similarity of each of these candidate areas (some first blocks) is equal to or greater than a predetermined first threshold similarity.

The similarity determining module 50A works to repeatedly compare pixels contained in a second block in the inputted image with each of the plurality of pattern images of the pattern image data PID stored in the HDD 28 while changing the location of the second block in and around each of the candidate areas in the inputted image.

The similarity determining module 50A works to determine the similarity of the pixels included in each of the different located second blocks with respect to each of the plurality of target pattern images based on the result of the repeated comparisons. The similarity of the pixels included in each of the different located second blocks with respect to each of the plurality of target pattern images will be referred to as "the similarity of each of the different located second blocks with respect to each of the plurality of target pattern images" hereinafter.

The similarity determining module 50A works to output, to the target-area specifying module 52A, the determined similarities of each of the different located second blocks with respect to the respective target pattern images.

The target-area specifying module 52A works to receive the determined similarities of each of the different located second blocks for each of the candidate areas with respect to the respective target pattern images. The target-area specifying module 52A also works to specify, as at least one pedestrian area, at least one of the candidate areas; the rate of the number of some different-sized second blocks to all of the different-sized second blocks for the at least one of the candidate areas is equal to or greater than the predetermined threshold rate; the similarity of each of some different-sized second blocks is equal to or greater than a predetermined second threshold similarity.

The target-area specifying module 52A works to output, to the warning-output control module 58, information indicative of the location of the specified at least one pedestrian area.

The functional module 40A can be implemented by the main unit 20 in software, hardware, or combinations of software and hardware.

For example, when the functional module 40A can be implemented by the main unit 20 in software, at least one pedestrian detecting program stored in the rewritable ROM 26 or the RAM 24 causes the CPU 22 to carry out a pedestrian detecting routine illustrated in FIG. 7.

Next, operations of the driver assist system 10A will be described hereinafter with reference to FIGS. 7, 8A, 8B, 8C, 9A, and 9B.

FIG. 7 is a flowchart illustrating the pedestrian detecting routine to be executed by the CPU 22 in accordance with the pedestrian detecting program according to the second embodiment. Like operations between the pedestrian detecting routine according to the first embodiment and that according to the second embodiment, to which like reference characters are assigned, are omitted or simplified in description.

When an image picked-up by the camera 12 is inputted to the CPU 22 via the camera controller 30 (the determination in step 100 is YES), the CPU 22 stores the inputted picked-up image in the RAM 24, and provides a preset number of different-sized first blocks to be compared with each of the plurality of pattern images in step 102A.

For example, in the second embodiment, the CPU 22 provides different sized first blocks W11, W12, and W13. Each of the different-sized first blocks W11, W12, and W13 for example consists of a matrix of pixels smaller than the number of pixels of the inputted picked-up image. The matrix size of the first block W11 is smaller than that of the first block W12, and the matrix size of the second block W12 is smaller than that of the third block W13.

In step 103A, the CPU 22 selects one of the different-sized first blocks W11 to W13, and sets the selected one of the different-sized first blocks W11 to W13 to, as a start location, the top left corner of the inputted picked-up image.

For example, in the second embodiment, the CPU 22 selects the first block W11, and sets the selected first block W11 to, as the start location, the top left corner of the inputted picked-up image.

Figure 8A:
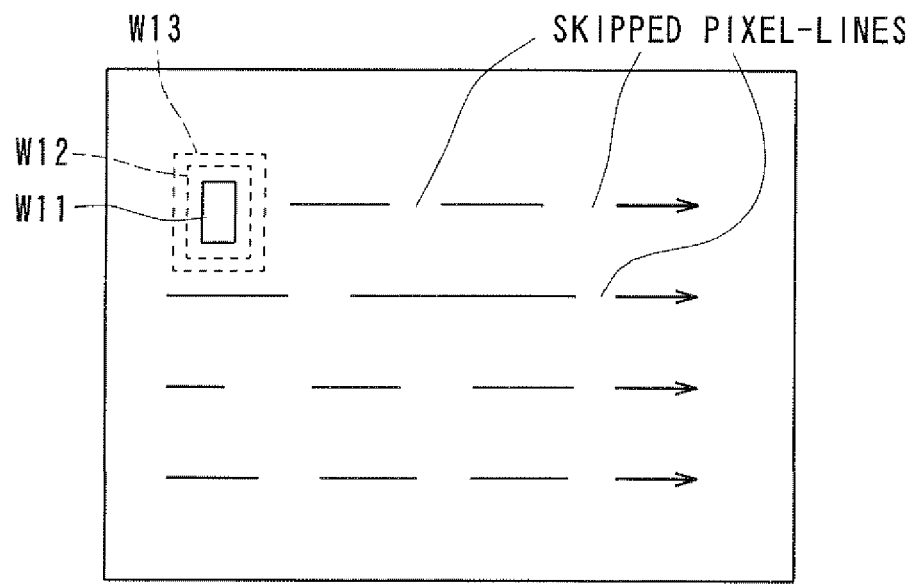
FIG. 8A is a view schematically illustrating how to sample pixels to be compared with a plurality of pattern images; these pixels are contained in an image picked-up by a camera illustrated in FIG. 6 according to the second embodiment.

Thereafter, the CPU 22 compares pixels contained in the first block W11 in the inputted picked-up image with each of the plurality of pattern images of the pattern image data PID while shifting the first block W11 from the start location to, as an end location, the bottom right corner of the inputted picked-up image in the row direction over the entire of the inputted picked-up image in step 104A with at least one pixel line of the inputted image being skipped (see FIG. 8A).

In step 104A, the CPU 22 determines the similarity of the pixels contained in each of the different-located first blocks W11 in the inputted picked-up image with respect to each of the plurality of target pattern images based on the result of the comparisons.

Next, in step 112A, the CPU 22 determines whether the determination of the similarities for all of the first blocks W11 to W13 is completed.

At that time, because the determination of the similarities for all of the different-located first blocks W11 is merely completed, the CPU 22 determines that the determination of the similarities for all of the first blocks W11 to W13 is not completed.

Then, the CPU 22 returns to step 103 to thereby select, as another one of the first blocks W11 to W13, the first block W12, and sets the selected first block W12 to the top left corner of the inputted picked-up image.

Thereafter, the CPU 22 carries out the operation in step 104A based on the selected first block W12 in place of the first block W11 to thereby determine the similarity of the pixels contained in each of the different-located first blocks W12 in the inputted picked-up image with respect to each of the plurality of target pattern images based on the result of the comparisons.

Next, in step 112A, the CPU 22 determines whether the determination of the similarities for all of the first blocks W11 to W13 is completed.

At that time, because the determination of the similarities for all of the different-located first blocks W11 and that of the similarities for all of the different-located first blocks W12 are merely completed, the CPU 22 determines that the determination of the similarities for all of the first blocks W11 to W13 is not completed.

Then, the CPU 22 returns to step 103, and carries out the operations in steps 103 and 104A based on the first block W13 in place of the first block W12. This determines the similarity of the pixels contained in each of the different-located first blocks W13 in the inputted picked-up image with respect to each of the plurality of target pattern images based on the result of the comparisons.

At that time, because the determination of the similarities for all of the first blocks W11 to W13 is completed, the CPU 22 carries out affirmative determination in step 112A, going to step 106A.

In step 106A, the CPU 22 determines whether the similarity of at least one of the different-located first blocks W11, W12, and W13 is equal to or greater than the predetermined first threshold similarity.

Upon determining that the similarity of each of the different-located first blocks W11, W12, and W13 is lower than the predetermined first threshold similarity (NO in step 106A), the CPU 22 terminates the pedestrian detecting routine.

Otherwise, upon determining that the similarity of some of the different-located first blocks W11, W12, and W13 is equal to or greater than the predetermined first threshold similarity (YES in step 106A), the CPU 22 goes to step 108A.

Figure 8B:
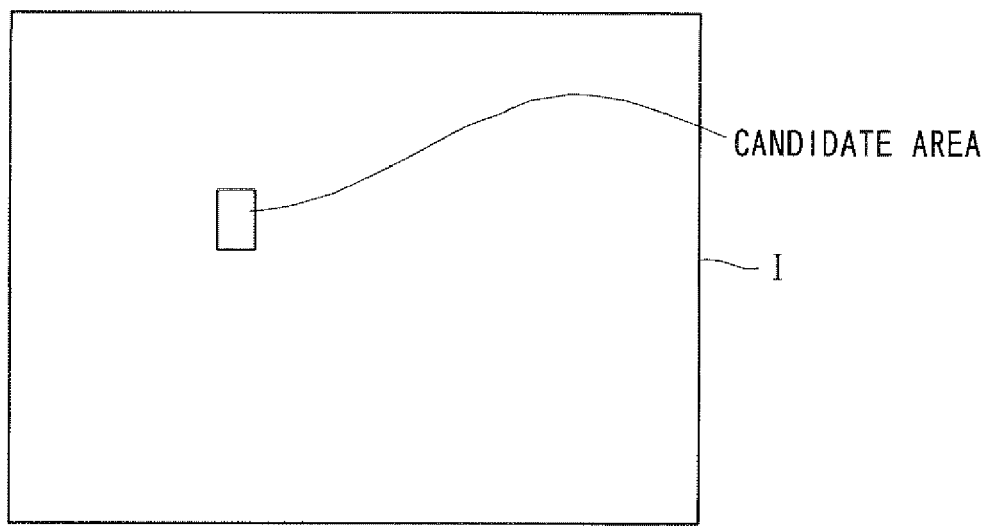
FIG. 8B is a view schematically illustrating one of candidate areas determined by the CPU according to the second embodiment.

In step 108A, the CPU 22 determines some of the different-located first blocks W11, W12, and W13 as candidate areas (see FIG. 8B).

Then, in step 108A, the CPU 22 determines the similarity of pixels contained in a second block in the inputted image with respect to each of the plurality of pattern images of the pattern image data PID stored in the HDD 28 while changing the location of the second block in and around each of the candidate areas in the inputted image.

Figure 8C:
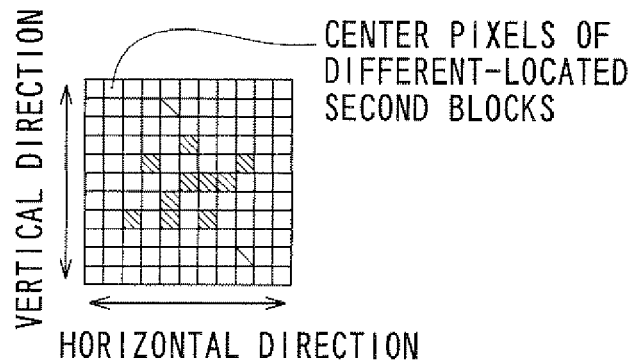
FIG. 8C is a view schematically illustrating similarities of different-located second blocks for any one of some of the candidate areas determined by the CPU according to the second embodiment.

FIG. 8C schematically illustrates the similarities of the different-located second blocks for any one of some of the candidate areas. Specifically, in FIG. 8C, the substantially center pixels of the different-located second blocks in and around any one of some of the candidate areas are illustrate. The number of hatchings in each of the center pixels of the different-located second blocks in and around any one of some of the candidate areas represents the level of similarity of a corresponding one of the different-located second blocks.

That is, the more the number of hatchings in each of the center pixels of the different-located second blocks is increased, the more the similarity of a corresponding one of the different-located second blocks is increased.

After completion of the operation in step 108A, the CPU 22 extracts some second blocks from all of the different-located second blocks for each of the candidate areas; the similarity of each of these extracted second blocks is equal to or greater than the predetermined second threshold similarity in step 114A.

In step 114A, the CPU 22 calculates the rate of the number of the extracted second blocks to the number of all of the different-located second blocks for each of the candidate areas.

Then, in step 115A, the CPU 22 specifies, as at least one pedestrian area, at least one of the candidate areas; the rate of the number of the extracted second blocks to the number of all of the second blocks for the at least one of the candidate areas is equal to or greater than the predetermined threshold rate.

FIG. 9A schematically illustrates, as dashed rectangular frames, first and second specified candidate areas CA1 and CA2 on the inputted picked-up image I. The first specified candidate area CA1 corresponds to a zone in which an actual pedestrian is present, and the second specified candidate area CA2 corresponds to a zone in which no pedestrians are present.

FIG. 9B schematically illustrates, on the inputted picked-up image I, the extracted second blocks SB1 in and around the first specified candidate area CA1, and the extracted second blocks SB2 in and around the second specified candidate area CA2.

FIG. 9B also schematically illustrates a third frequency distribution F11 of the extracted second blocks SB1, and a fourth frequency distribution of the extracted second blocks SB2. In FIG. 9B, the substantially center pixel of each of the second blocks SB1 and SB2 is dotted in black to thereby provide each of the third and fourth frequency distributions F11 and F12.

Referring to FIGS. 9A and 9B, a large number of the extracted second blocks located in and around the first candidate area CA1 in which an actual pedestrian is present are closely arranged, but a few extracted second blocks located in and around the second candidate area CA2 in which no pedestrians are present are closely arranged.

Therefore, when the rate of the number of the extracted second blocks to the number of all of the second blocks for at least one candidate area is equal to or greater than the predetermined second threshold rate, it is possible to specify, as at least one pedestrian area, the at least one candidate area (see steps 114A and 115A).

This prevents the CPU 22 from erroneously specifying, as at least one pedestrian area, a candidate area in and around which a few extracted second blocks are closely located; the rate of a few extracted second blocks to the number of all of the second blocks for the candidate area is smaller than the second threshold rate. This can specify the at least one pedestrian area with high accuracy.

After completion of the operation in step 115A, the CPU 22 displays the inputted picked-up image on the screen of the display 14 in color while visibly identifying the specified at least one pedestrian area on the displayed picked-up image in step 116A as well as the operation in step 116 illustrated in FIG. 3.

As described above, the driver assist system 10A according to the second embodiment is designed to coarsely search the inputted picked-up image for candidate areas in which a pedestrian is likely to be present to thereby specify the candidate areas.

The driver assist system 10A is also designed to repeatedly compare pixels contained in a second block in the inputted image with each of the plurality of pattern images of the pattern image data PID stored in the HDD 28 while changing the location of the second block in and around the candidate areas in the inputted image to thereby determine the similarity of each of the different located second blocks with respect to each of the plurality of target pattern images based on the result of the repeated comparisons.

Furthermore, the driver assist system 10A is designed to specify, as at least one pedestrian area, at least one of the candidate areas; the rate of the number of some different-sized second blocks for the at least one of the candidate areas is equal to or greater than the predetermined second threshold rate.

The configuration of the driver assist system 10A achieves an effect of eliminating the need to closely searching another region located except in and around each of the candidate areas. Thus, in addition to the effect achieved by the configuration of the driver assist system 10, it is possible to achieve an effect of reducing the time required to specify at least one pedestrian area.

In the foregoing first and second embodiments, the present invention is applied to a driver assist system installed in a vehicle for detecting, as a target, pedestrians around the vehicle so as to warn a driver of the vehicle, but the present invention is not limited to the application.

Specifically, the present invention can be applied to object detection systems for detecting a target object from a plurality of images picked up by a pickup device.

In the first embodiment, the CPU 22 is programmed to specify, as at least one pedestrian area, at least one region containing the number of some candidate areas that are closely arranged in the distribution; the rate of this number of some candidate areas to the total number of the candidate areas is equal to or greater than the predetermined threshold rate. Similarly, in the second embodiment, the CPU 22 is programmed to specify, as at least one pedestrian area, at least one of the candidate areas; the rate of the number of some different-sized second blocks to all of the different-sized second blocks for the at least one of the candidate areas is equal to or greater than the predetermined second threshold rate. The present invention is however limited to the structures.

Specifically, the present invention can be configured to determine at least one pedestrian area based on the candidate-area distribution or the second-block distribution. For example, the present invention can be configured to specify, as at least one pedestrian area, an overlapped region of some candidate areas that are closely arranged in the distribution; the rate of this number of some candidate areas to the total number of the candidate areas is equal to or greater than the predetermined threshold rate. Similarly, the present invention can be configured to determine, as at least one pedestrian area, an overlapped region of some different-sized second blocks, the rate of the number of some different-sized second blocks to all of the different-sized second blocks for the at least one of the candidate areas is equal to or greater than the predetermined second threshold rate.

In the second. embodiment, the first threshold rate and the second threshold rate can be set to be identical to each other, or different from each other. For example, the first threshold rate can be set to be lower than the second threshold rate.

The hardware configuration of the driver assist system 10 is an example of various hardware configurations of the driver assist system 10. Thus, the hardware configuration of the driver assist system 10 can be modified within the scope of the subject matter of the present invention. The functional configurations of the driver assist systems 10 and 10A are examples of various functional configurations of the driver assist systems 10 and 10A. Thus, the functional configurations of the driver assist systems 10 and 10A can be modified within the scope of the subject matter of the present invention.

The pedestrian detecting routines illustrated in FIGS. 3 and 7 are examples of various pedestrian detecting routines, and therefore, they can be modified within the scope of the subject matter of the present invention.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A system for detecting a target object, the system comprising:
  an image pick-up unit configured to pick up an image of a predetermined target region;
  a storage unit configured to store therein pattern image data for the target object, the pattern image data representing a feature of the target object;
  a similarity determining unit configured to:
  (a) set a first block in the picked-up image;
  (b) compare a first part of the picked-up image contained in the first block with the pattern image data and repeat the comparison for each of plural shifted locations of the first block in the picked-up image to thereby determine a similarity of respectively corresponding plural parts of the picked-up image contained in a corresponding one of the differently-located first blocks with respect to the pattern image data;
  (c) extract, as at least one candidate area, at least one of the differently-located first blocks, if the determined similarity in that block is equal to or greater than a predetermined first threshold similarity;
  (d) set a second block in the picked-up image; and
  (e) compare a second part of the picked-up image contained in the second block with the pattern image data and repeat the comparison for each of plural shifted locations of the second block in and around the at least one candidate area in the picked-up image to thereby determine a similarity of each of the second parts of the picked-up image contained in a corresponding one of the differently-located second blocks with respect to the pattern image data; and
  a specifying unit configured to:
  (a) extract some of the differently-located second blocks from all of the differently-located second blocks, if the determined similarity of the second part of the picked-up image contained in each of the extracted differently-located second blocks is equal to or greater than a predetermined second threshold similarity;
  (b) calculate, as information indicative of the frequency distribution of some of the differently-located second blocks in the picked-up image, a rate of the number of some of the differently-located second blocks to the number of all of the differently-located second blocks;
  (c) determine whether the calculated rate of the number of some of the differently-located second blocks to the number of all of the differently-located second blocks is equal to or greater than a predetermined threshold rate; and
  (d) specify the target area in the picked-up image when it is determined that the calculated rate of the number of the extracted differently-located second blocks to the number of all of the differently-located second blocks is equal to or greater than the predetermined threshold rate.

2. The system according to claim 1, wherein the similarity determining unit is configured to compare the part of the picked-up image contained in the block with the pattern image data while changing size and location of the block in the picked-up image to thereby determine a similarity of each of the parts of the picked-up image contained in a corresponding one of the differently-located and differently-sized blocks with respect to the pattern image data.

3. The system according to claim 1, wherein the similarity determining unit is configured to compare the first part of the picked-up image contained in the first block with the pattern image data while shifting the location of the first block in the picked-up image and also changing a size of the first block.

4. The system according to claim 1, wherein the rate of the number of the extracted differently-located second blocks to the number of all of the differently-located second blocks establishes that the extracted differently-located second blocks are closely arranged in and around the at least one candidate area.

\* \* \* \* \*